US012566309B2

(12) United States Patent
Muto et al.

(10) Patent No.: US 12,566,309 B2
(45) Date of Patent: Mar. 3, 2026

(54) LENS BARREL AND IMAGING DEVICE

(71) Applicant: NIKON CORPORATION, Tokyo (JP)

(72) Inventors: Azusa Muto, Kawasaki (JP); Takatoshi Ashizawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 350 days.

(21) Appl. No.: 18/266,509

(22) PCT Filed: Dec. 20, 2021

(86) PCT No.: PCT/JP2021/046962
§ 371 (c)(1),
(2) Date: Jun. 9, 2023

(87) PCT Pub. No.: WO2022/138542
PCT Pub. Date: Jun. 30, 2022

(65) Prior Publication Data
US 2024/0103249 A1 Mar. 28, 2024

(30) Foreign Application Priority Data
Dec. 25, 2020 (JP) ................................. 2020-217238

(51) Int. Cl.
*G02B 7/04* (2021.01)
(52) U.S. Cl.
CPC ...................................... *G02B 7/04* (2013.01)
(58) Field of Classification Search
CPC ..................................... G02B 7/04; G02B 7/08
USPC ................................................. 359/822, 823
See application file for complete search history.

(56) References Cited

U.S. PATENT DOCUMENTS

| | | | |
|---|---|---|---|
| 2015/0062408 A1 | 3/2015 | Yano | |
| 2015/0296112 A1* | 10/2015 | Park | G02B 7/08 |
| | | | 348/208.7 |
| 2017/0052388 A1* | 2/2017 | Kim | G02B 27/646 |
| 2018/0027185 A1* | 1/2018 | Miller | G02B 27/646 |
| | | | 348/208.11 |

(Continued)

FOREIGN PATENT DOCUMENTS

| | | |
|---|---|---|
| JP | 2015-049334 A | 3/2015 |
| JP | 2020-064284 A | 4/2020 |
| WO | 2019/187634 A1 | 10/2019 |

OTHER PUBLICATIONS

Aug. 13, 2024 Office Action issued in Japanese Patent Application No. 2022-571432.

(Continued)

*Primary Examiner* — William R Alexander
(74) *Attorney, Agent, or Firm* — Oliff PLC

(57) ABSTRACT

A lens barrel includes first and second yokes each having a length in an optical axis direction, a third yoke that has a length in the optical axis direction and is disposed between the first and second yokes, first and second magnets disposed on the first and second yokes, respectively, a coil that is penetrated by the third yoke and is movable in the optical axis direction by magnetic forces of the first and second magnets, and a lens holding frame that holds a lens and is movable together with the coil in the optical axis direction, wherein a first plane including a first side surface, which is farther from the third yoke, of the first yoke intersects with a second plane including a second side surface, which is farther from the third yoke, of the second yoke.

15 Claims, 8 Drawing Sheets

(56) References Cited

U.S. PATENT DOCUMENTS

| | | | |
|---|---|---|---|
| 2018/0364445 A1* | 12/2018 | Osaka | H04N 23/54 |
| 2019/0064475 A1* | 2/2019 | Kobayashi | G03B 13/34 |
| 2019/0103799 A1* | 4/2019 | Kawanabe | G03B 3/10 |
| 2019/0273847 A1* | 9/2019 | Lee | H04N 23/55 |
| 2020/0117074 A1 | 4/2020 | Fujinaka | |
| 2022/0094853 A1* | 3/2022 | Xu | H04N 23/54 |
| 2025/0013126 A1* | 1/2025 | Mori | G03B 5/00 |

OTHER PUBLICATIONS

Jan. 25, 2022 International Search Report issued in International Patent Application No. PCT/JP2021/046962.
Jun. 13, 2023 International Preliminary Report on Patentability issued in International Patent Application No. PCT/ JP2021/ 046962.
Apr. 23, 2024 Office Action issued in Japanese Patent Application No. 2022-571432.

\* cited by examiner

OPTICAL AXIS
DIRECTION

OPTICAL AXIS
DIRECTION

CIRCUMFERENTIAL
DIRECTION

CIRCUMFERENTIAL
DIRECTION

LENS BARREL AND IMAGING DEVICE

TECHNICAL FIELD

The present disclosure relates to a lens barrel and an imaging device.

BACKGROUND ART

A lens barrel employing a voice coil motor as a lens driving device has been proposed (for example, Patent Document 1). In the lens barrel, an improvement in driving force is desired.

PRIOR ART DOCUMENT

Patent Document

Patent Document 1: Japanese Patent Application Laid-Open No. 2015-49334

SUMMARY OF THE INVENTION

According to a first aspect, there is provided a lens barrel including: a first yoke and a second yoke each having a length in an optical axis direction; a third yoke that has a length in the optical axis direction and is disposed between the first yoke and the second yoke; a first magnet disposed on the first yoke; a second magnet disposed on the second yoke; a coil that is penetrated by the third yoke and is movable in the optical axis direction by magnetic forces of the first magnet and the second magnet; and a lens holding frame that holds a lens and is movable together with the coil in the optical axis direction, wherein a first plane including a first side surface, which is farther from the third yoke of two side surfaces facing each other in a circumferential direction of the lens of the first yoke intersects with a second plane including a second side surface, which is farther from the third yoke of two side surfaces facing each other in the circumferential direction of the second yoke.

According to a second aspect, there is provided an imaging device including the above lens barrel.

Note that the configurations of the embodiments described below may be appropriately modified, and at least one of the components may be replaced with another component. Furthermore, constituent elements whose arrangement is not particularly limited are not limited to the arrangement disclosed in the embodiment, and can be arranged at positions where their functions can be achieved.

MODES FOR CARRYING OUT THE INVENTION

Hereinafter, a lens barrel 100 in accordance with an embodiment will be described in detail with reference to the drawings. In each drawing, illustration of some elements may be omitted in order to facilitate understanding.

Figure 1:
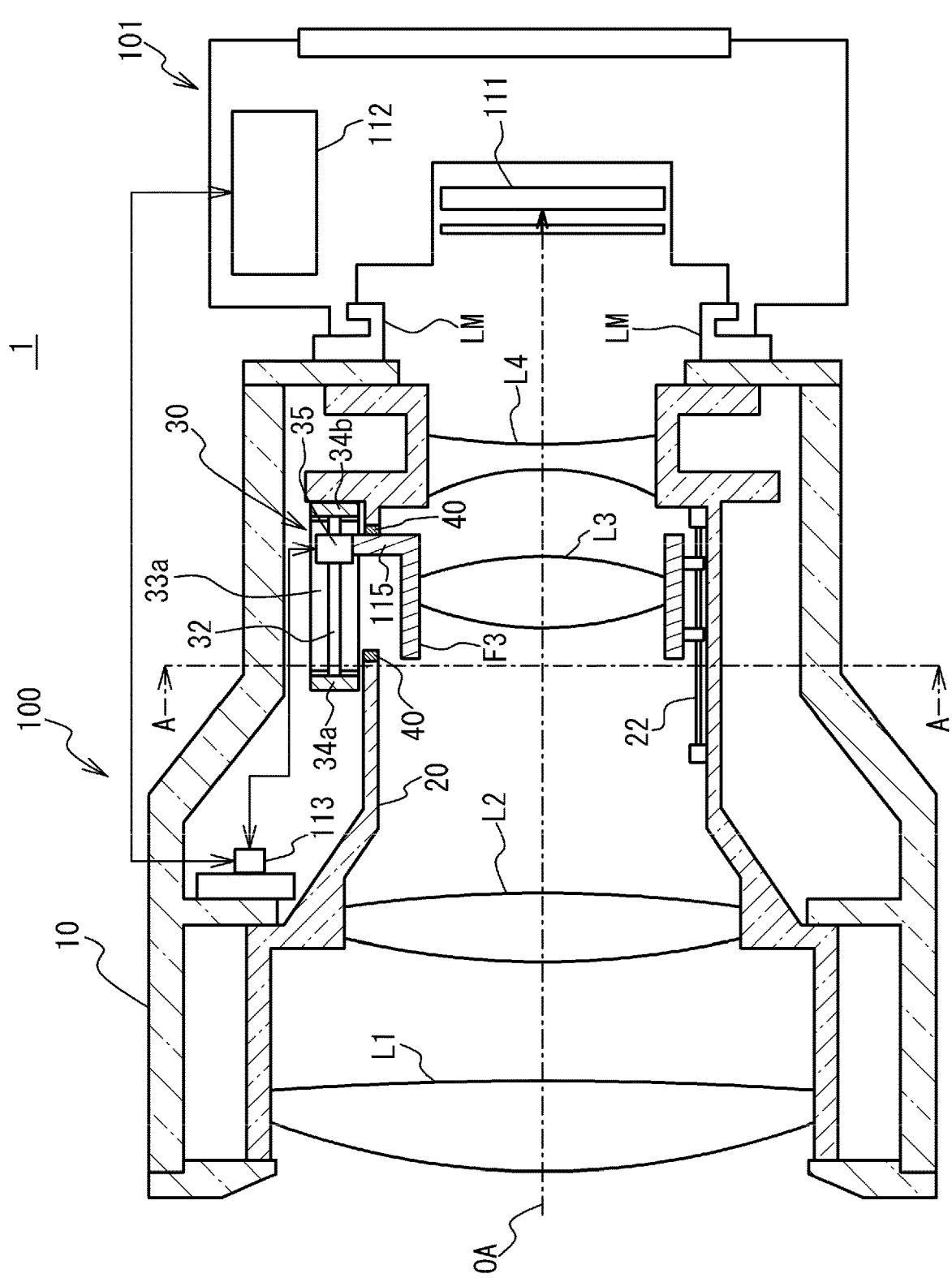
FIG. 1 is a diagram illustrating a camera including a lens barrel in accordance with an embodiment and a camera body.

FIG. 1 is a diagram illustrating a camera 1 including the lens barrel 100 in accordance with the present embodiment and a camera body 101. In the present embodiment, the lens barrel 100 is attachable to and detachable from the camera body 101, but this does not intend to suggest any limitation, and the lens barrel 100 and the camera body 101 may be integrated.

The camera body 101 includes an image sensor 111, a control unit 112, and the like inside. The image sensor 111 includes a photoelectric conversion element such as a charge coupled device (CCD), and converts a subject image formed by the imaging optical system (the lens barrel 100 attached to the camera body 101) into an electric signal.

The control unit 112 includes a central processing unit (CPU) and the like, and integrally controls operations of the camera 1 related to photographing including focus driving in the camera body 101 and the attached lens barrel 100 as a whole.

As illustrated in FIG. 1, the lens barrel 100 of the present embodiment includes a first fixed barrel 10 and a second fixed barrel 20 disposed radially further inward than the first fixed barrel 10. In the present embodiment, the first fixed barrel 10 is composed of a plurality of components, but may be composed of one component. As illustrated in FIG. 1, a lens mount LM that allows the lens barrel 100 to be attached to and detached from the camera body 101 is fixed to the first fixed barrel 10.

Further, the lens barrel 100 includes a plurality of lenses L1 to L4 sequentially arranged along the common optical axis OA. The lens L3 is held by a lens holding frame F3, and the other lenses are held by the second fixed barrel 20. Each of the lenses L1 to L4 may be composed of a plurality of lenses.

The lens barrel 100 also includes a guide bar 22 that guides the lens holding frame F3 in the optical axis direction. The guide bar 22 is fixed to the second fixed barrel 20. Instead of the guide bar 22, the lens holding frame F3 may be guided in the optical axis direction by a straight groove extending in the optical axis direction.

In the present embodiment, the lens L3 is a focus lens and is moved in the optical axis direction to adjust the focus. The lens L3 is provided so as to be moved in the optical axis direction by a voice coil motor (VCM) 30 disposed inside the lens barrel 100.

The VCM 30 is driven by a drive device 113. The drive device 113 controls focus driving of the lens L3 under the control by the control unit 112 of the camera body 101.

Specifically, the drive device 113 generates drive signals for the VCM 30 based on the position information of the lens L3 input from the position detection mechanism (not illustrated) such as an optical encoder or magnetic encoder and the target position information of the lens L3 input from the control unit 112 of the camera body 101, and outputs the generated drive signals to the VCM 30.

The VCM 30 linearly drives the lens L3 in the optical axis direction according to the drive signal. Although details will be described later, as illustrated in FIG. 1, the lens holding frame F3 is connected to a coil 35 of the VCM 30. Specifically, the lens holding frame F3 is connected to the coil 35 through a connection portion 115 of the lens holding frame F3 by, for example, an adhesive. Thus, when the coil 35 is linearly driven in the optical axis direction, the lens holding frame F3 is linearly driven in the optical axis direction, and the position of the lens L3 in the optical axis direction is changed.

When the drive signal for the VCM 30 is OFF, the coil 35 of the VCM 30 has no holding force to maintain its position, and thus moves freely. Therefore, when the lens barrel 100 is oriented upward or downward, the coil 35 may move due to the weights of the lens holding frame F3 and the lens L3, and the lens holding frame F3 may collide with the second fixed barrel 20 and generate an impact sound. Therefore, as illustrated in FIG. 1, a cushioning member 40 is provided in a portion of the second fixed barrel 20 overlapping the lens holding frame F3 in the optical axis direction. As a result, since the connection portion 115 collides with the cushioning member 40, the impact is reduced and the impact sound is reduced.

In the camera 1 including the camera body 101 and the lens barrel 100 as described above, when a shutter button (not illustrated) is pressed (a release operation or a focusing operation is performed), the control unit 112 in the camera body 101 performs control such as focus driving of the lens barrel 100 through the drive device 113. The image sensor 111 converts light of the subject image formed by the lens barrel 100 into an electric signal, and the image data is recorded in a memory (not illustrated) provided in the camera body 101 (that is, shooting is performed).

Figures 2A, 2B, 2C:
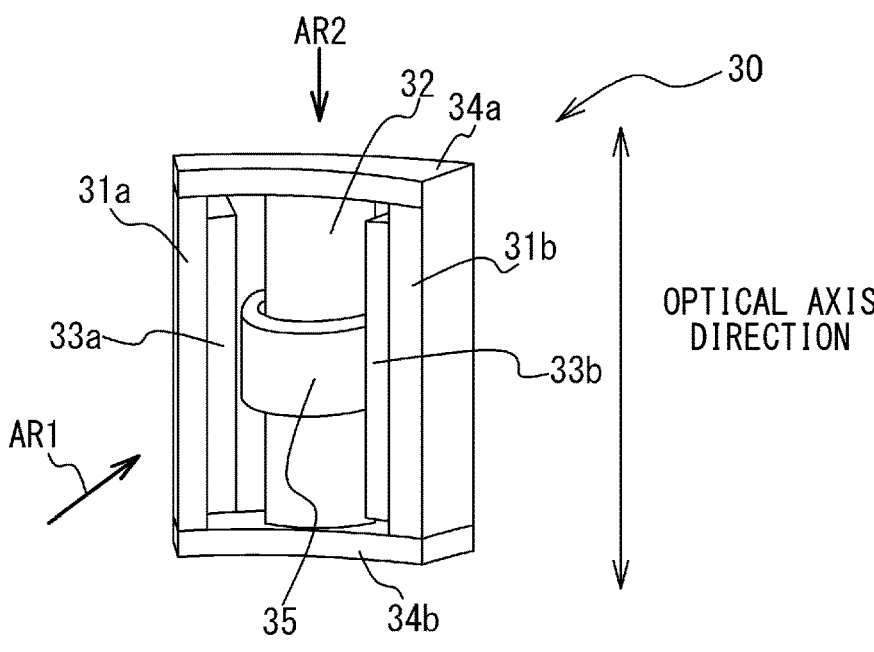
FIG. 2A is a perspective view of a voice coil motor in accordance with a first embodiment.
FIG. 2B is a diagram of the voice coil motor as viewed from a direction indicated by an arrow AR1 in FIG. 2A.
FIG. 2C is a diagram of the voice coil motor as viewed from a direction indicated by an arrow AR2 in FIG. 2A.
Figure 3A:
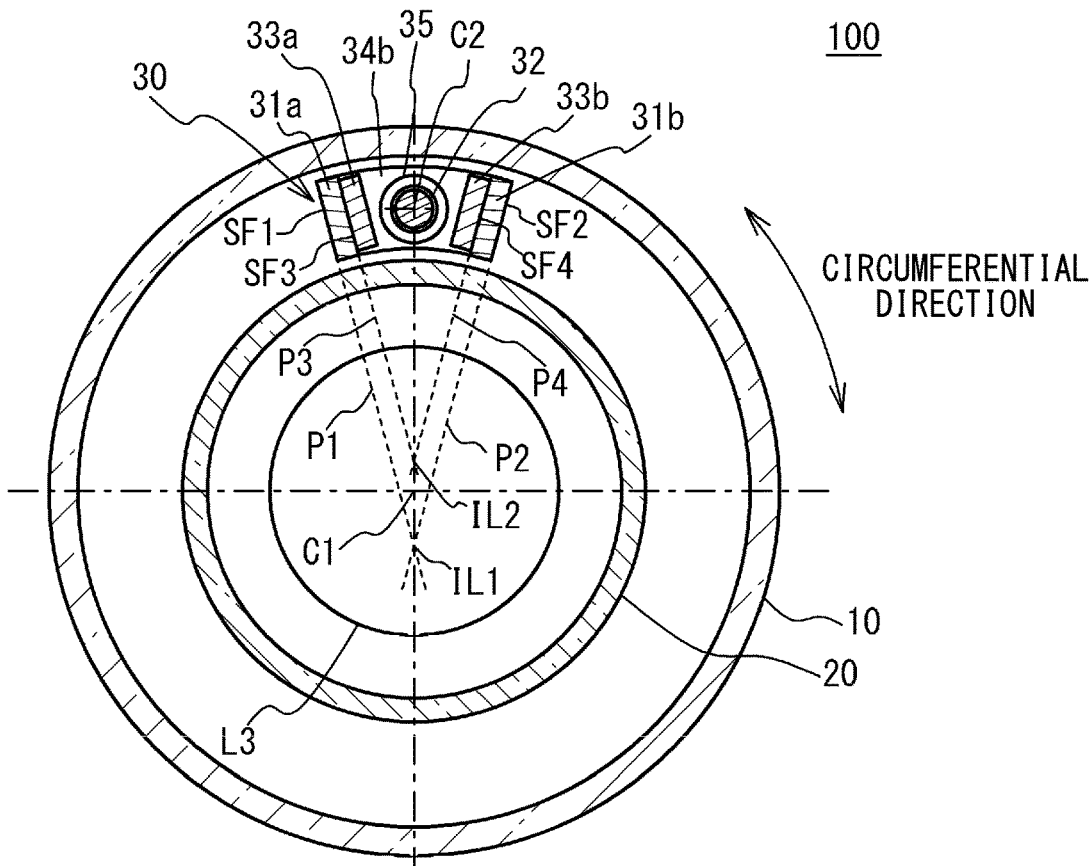
FIG. 3A is a cross-sectional view taken along line A-A in FIG. 1.

Next, the configuration of the VCM 30 that drives the lens L3 is described. FIG. 2A is a perspective view illustrating the configuration of the VCM 30, FIG. 2B is a diagram of the VCM 30 as viewed from the direction indicated by an arrow AR1 in FIG. 2A, and FIG. 2C is a diagram of the VCM 30 as viewed from the direction indicated by an arrow AR2 in FIG. 2A. FIG. 3A is a cross-sectional view taken along line A-A in FIG. 1, and FIG. 3B is an enlarged view of the vicinity of the VCM 30 in FIG. 3A.

As illustrated in FIG. 2A, the VCM 30 in accordance with the present embodiment includes a first side yoke 31a and a second side yoke 31b each having a length in the optical axis direction, and a center yoke 32 that has a length in the optical axis direction and is disposed between the first side yoke 31a and the second side yoke 31b.

Figure 3B:
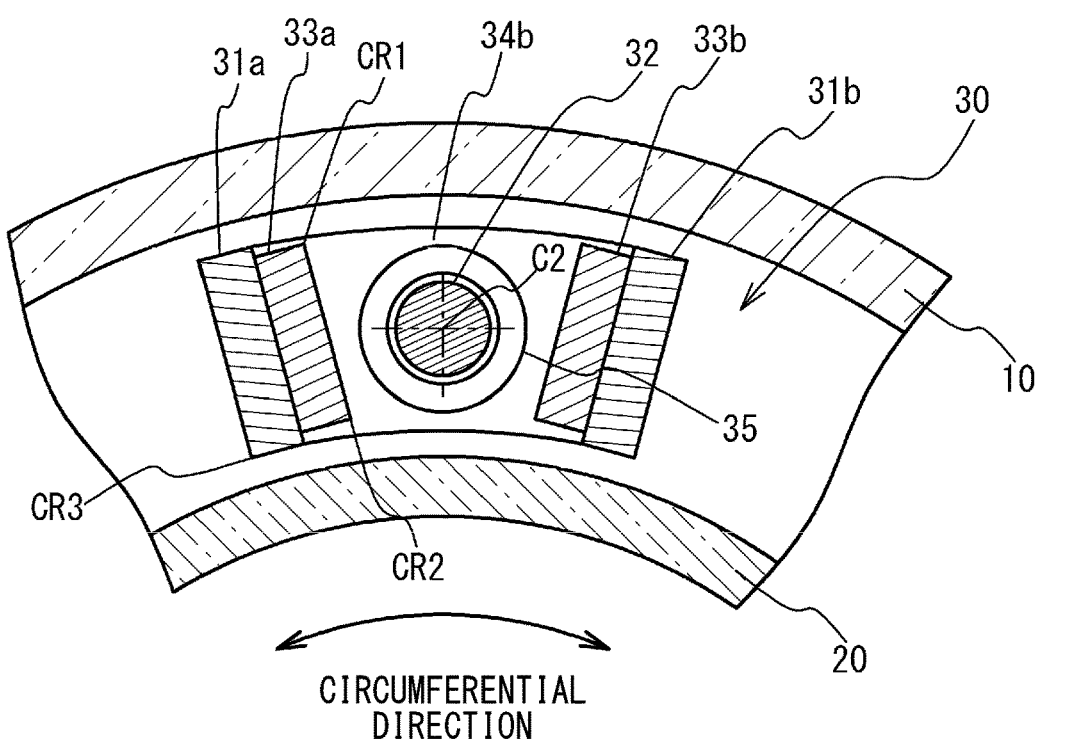
FIG. 3B is an enlarged view of the vicinity of the voice coil motor in FIG. 3A.

As illustrated in FIG. 3A and FIG. 3B, the cross sections of the first side yoke 31a and the second side yoke 31b in a plane perpendicular to the optical axis OA have a rectangular shape, and the cross-sectional areas of the first side yoke 31a and the second side yoke 31b in the plane perpendicular to the optical axis OA are uniform along the optical axis OA. Further, the cross section of the center yoke 32 in a plane perpendicular to the optical axis OA has a substantially circular shape, and the cross-sectional area of the center yoke 32 in the plane perpendicular to the optical axis OA is uniform along the optical axis OA.

The VCM 30 also includes an upper yoke 34a connecting first ends of the first side yoke 31a, the second side yoke 31b, and the center yoke 32 in the optical axis direction, and a lower yoke 34b connecting second ends of the first side yoke 31a, the second side yoke 31b, and the center yoke 32 in the optical axis direction. This structure forms a closed magnetic circuit.

A first magnet 33a is disposed on a side surface at the center yoke 32 side of the first side yoke 31a, and a second magnet 33b is disposed on a side surface at the center yoke 32 side of the second side yoke 31b. As illustrated in FIG. 3A and FIG. 3B, the cross sections of the first magnet 33a and the second magnet 33b in a plane perpendicular to the optical axis OA have a rectangular shape, and the cross-sectional areas of the first magnet 33a and the second magnet 33b in the plane perpendicular to the optical axis OA are uniform along the optical axis OA.

As illustrated in FIG. 2B, for example, the first magnet 33a is disposed so that the side closer to the center yoke 32 is the north pole, and the second magnet 33b is also disposed so that the side closer to the center yoke 32 is the north pole. Thus, as indicated by arrows in FIG. 2B, magnetic paths are formed in which magnetic fluxes enter the center yoke 32 from the north poles of the first magnet 33a and the second magnet 33b, pass through the upper yoke 34a and the lower yoke 34b and the first side yoke 31a and the second side yoke 31b, and return to the south poles of the first magnet 33a and the second magnet 33b, respectively.

The materials of the first and second side yokes 31a and 31b and the upper and lower yokes 34a and 34b are, for example, steel plate cold commercial (SPCC), and the material of the center yoke 32 is, for example, steel structure (SS) 400.

The VCM 30 includes the coil 35 penetrated by the center yoke 32. There is a slight clearance between the inner peripheral surface of the coil 35 and the center yoke 32, and the coil 35 is movable in the optical axis direction. Further, the coil 35 is configured so that the direction of the magnetic flux collected from the first side yoke 31a and the second side yoke 31b to the center yoke 32 is perpendicular to the winding direction of the coil 35.

A drive signal (current) is input to the coil 35 from the drive device 113. When a current flows through the coil 35, the coil 35 moves in the optical axis direction due to the magnetic forces of the first magnet 33a and the second magnet 33b. More specifically, the coil 35 moves in the optical axis direction due to the electromagnetic interaction between the coil 35 through which the current flows and the first magnet 33a and the second magnet 33b. By changing the direction of the current flowing through the coil 35, the moving direction of the coil 35 can be switched between the object side and the camera body 101 side (image side). Further, the driving force and the moving speed of the coil 35 can be changed by changing the value of the current flowing through the coil 35.

In the present embodiment, as illustrated in FIG. 3A, the VCM 30 is disposed between the first fixed barrel 10 and the second fixed barrel 20. Therefore, as illustrated in FIG. 2C, the upper yoke 34a (and the lower yoke 34b) has an arc shape, and as illustrated in FIG. 3A and FIG. 3B, the first side yoke 31a and the second side yoke 31b are arranged non-parallel to each other. Since the first side yoke 31a and the second side yoke 31b are arranged non-parallel to each other, the VCM 30 can be efficiently arranged between the first fixed barrel 10 and the second fixed barrel 20.

More specifically, as illustrated in FIG. 3A, in the VCM 30, a plane P1 including the side surface SF1, which is farther from the center yoke 32 of two side surfaces facing each other in the circumferential direction of the lens L3 of the first side yoke 31*a* intersects with a plane P2 including the side surface SF2, which is farther from the center yoke 32 of two side surfaces facing each other in the circumferential direction of the second side yoke 31*b*. Further, the plane P1 and the plane P2 intersect at a position different from the center point C1 of the lens L3. That is, the intersection line IL1 between the plane P1 and the plane P2 does not intersect the center point C1 of the lens L3. The center point C1 of the lens L3 is located between the center yoke 32 and the intersection line IL1.

In a plane perpendicular to the optical axis OA, the intersection line IL1 is on a straight line connecting the center point C2 of the center yoke 32 and the center point C1 of the lens L3. In other words, in a plane perpendicular to the optical axis OA, the center point C2 of the center yoke 32, the center point C1 of the lens L3, and the intersection line IL1 are on one straight line. The intersection line IL1 also intersects with the lens L3.

Furthermore, since the first side yoke 31*a* and the second side yoke 31*b* are disposed non-parallel to each other, the first magnet 33*a* and the second magnet 33*b* attached to the side surfaces at the center yoke 32 side of the first side yoke 31*a* and the second side yoke 31*b*, respectively are also non-parallel to each other. More specifically, a plane P3 including the side surface SF3, which is farther from the center yoke 32 of two side surfaces facing each other in the circumferential direction of the lens L3 of the first magnet 33*a* intersects with a plane P4 including the side surface SF4, which is farther from the center yoke 32 of two side surfaces facing each other in the circumferential direction of the second magnet 33*b*. The intersection line IL2 between the plane P3 and the plane P4 intersects the lens L3. The intersection line IL2 is located between the center yoke 32 and the center point C1 of the lens L3. More specifically, the intersection line IL2 is on a straight line connecting the center point C2 of the center yoke 32 and the center point C1 of the lens L3.

Figure 4A:
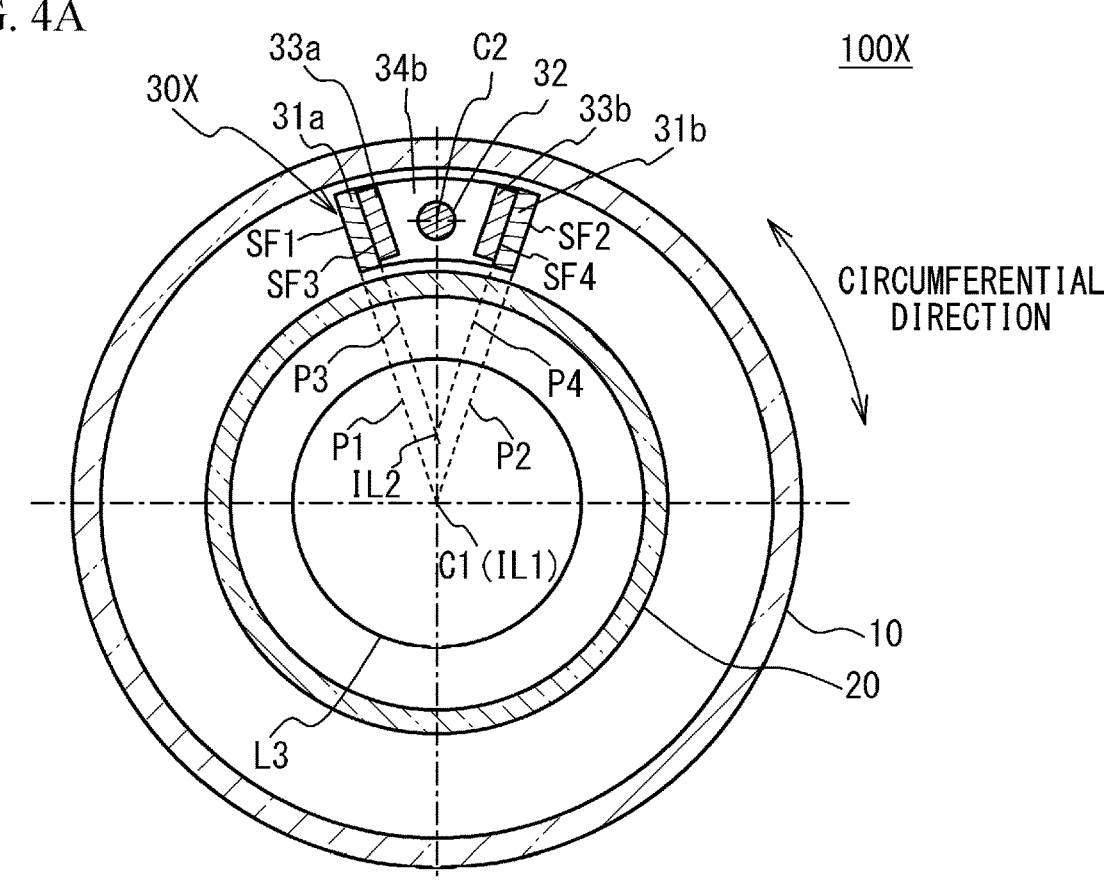
FIG. 4A illustrates an example in which a voice coil motor in accordance with a comparative example is disposed between a first fixed barrel 10 and a second fixed barrel 20.

FIG. 4A illustrates an example in which a VCM 30X in accordance with a comparative example is disposed between the first fixed barrel 10 and the second fixed barrel 20. Also in the VCM 30X of the comparative example, similarly to the VCM 30, the first side yoke 31*a* and the second side yoke 31*b* are disposed non-parallel to each other. However, in the comparative example, the intersection line IL1 between the plane P1 including the side surface SF1 of the first side yoke 31*a* and the plane P2 including the side surface SF2 of the second side yoke 31*b* intersects the center point C1 of the lens L3. Since other configurations are the same as those of the VCM 30, detailed description thereof will be omitted.

Figure 4B:
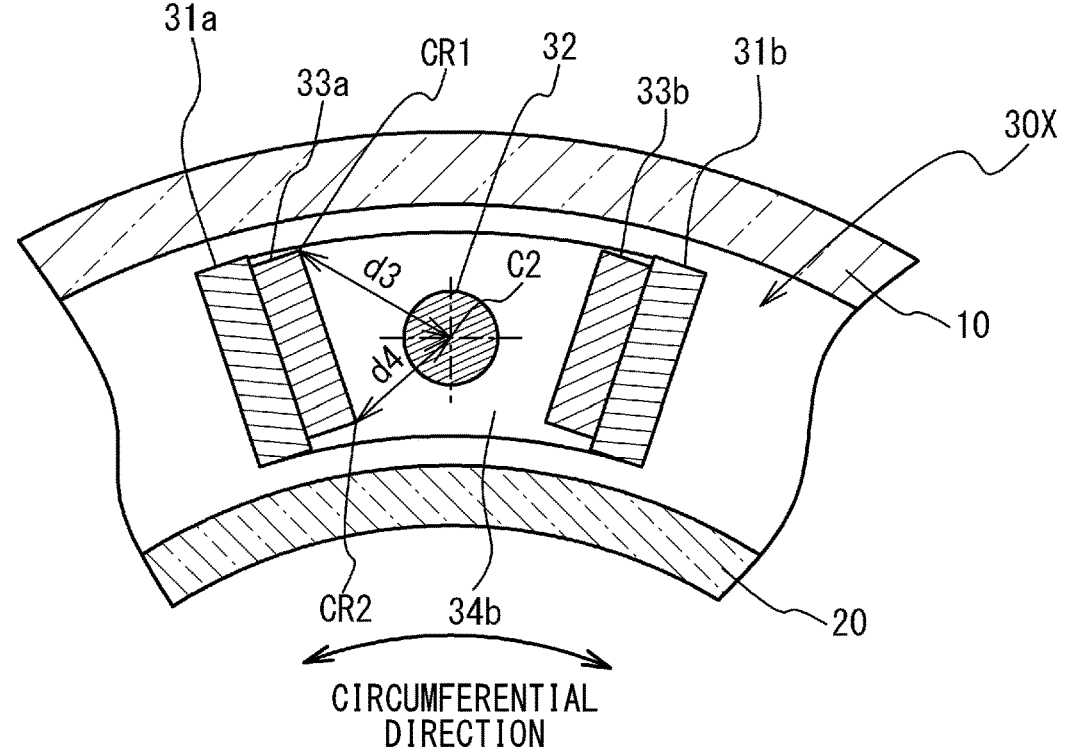
FIG. 4B is an enlarged view of the vicinity of the voice coil motor in FIG. 4A.

FIG. 4B is an enlarged view of the vicinity of the VCM 30X in FIG. 4A. As illustrated in FIG. 4B, in the VCM 30X of the comparative example, in the plane perpendicular to the optical axis OA, the distance d3 between the outer peripheral corner CR1 at the center yoke 32 side of the first magnet 33*a* and the center point C2 of the center yoke 32 is longer than the distance d4 between the inner peripheral corner CR2 at the center yoke 32 side of the first magnet 33*a* and the center point C2 of the center yoke 32. Therefore, the magnetic field at the outer peripheral side is weaker than the magnetic field at the inner peripheral side, and there is a concern that a desired driving force cannot be obtained in the VCM 30X of the comparative example.

In contrast, in the VCM 30 of the present embodiment, as illustrated in FIG. 3A, the first side yoke 31*a* and the second side yoke 31*b* are arranged so that the intersection line IL1 between the plane P1 including the side surface SF1 of the first side yoke 31*a* and the plane P2 including the side surface SF2 of the second side yoke 31*b* does not intersect with the center point C1 of the lens L3, and the center point C1 of the lens L3 is located between the center yoke 32 and the intersection line IL1.

Figure 5:
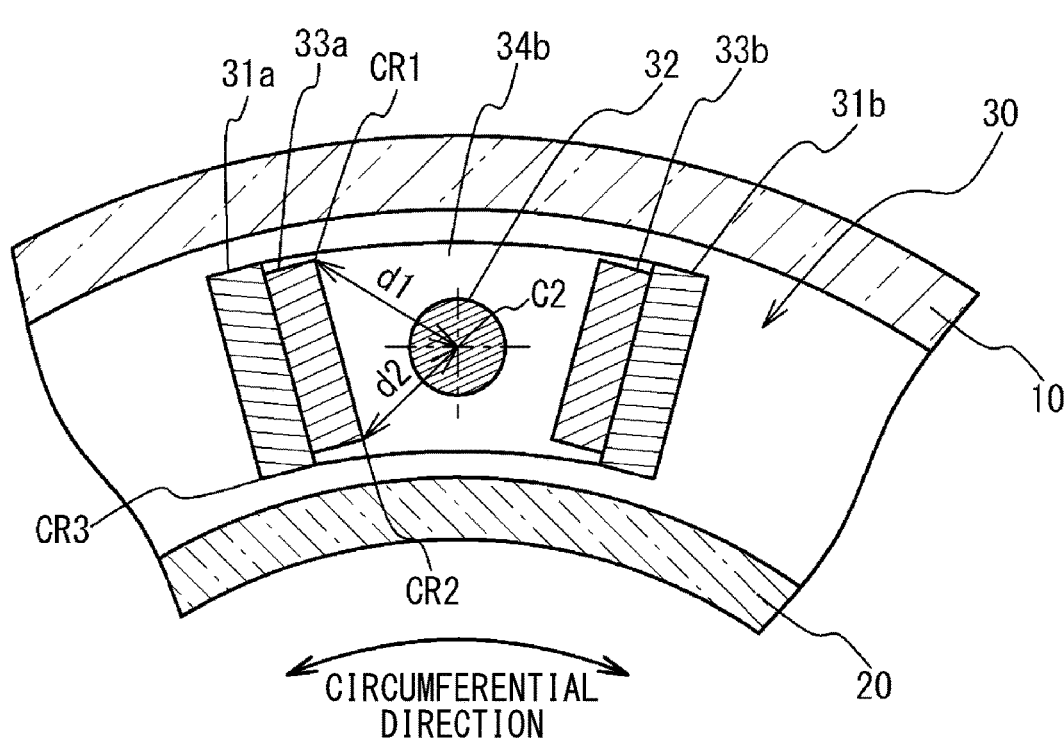
FIG. 5 is an enlarged view of the vicinity of the voice coil motor in FIG. 3A.

Therefore, as illustrated in FIG. 5, the difference (d1–d2) between the distance d1 between the outer peripheral corner CR1 at the center yoke 32 side of the first magnet 33*a* and the center point C2 of the center yoke 32 and the distance d2 between the inner peripheral corner CR2 at the center yoke 32 side of the first magnet 33*a* and the center point C2 of the center yoke 32 is smaller than the difference (d3–d4) between the distance d3 and the distance d4 in the VCM 30X of the comparative example. As a result, in the VCM 30, the magnetic field at the outer peripheral side is stronger than that in the VCM 30X of the comparative example, and thus the driving force of the VCM 30 is improved more than that of the VCM 30X of the comparative example. Therefore, the lens L3 can be stably driven.

Figure 6:
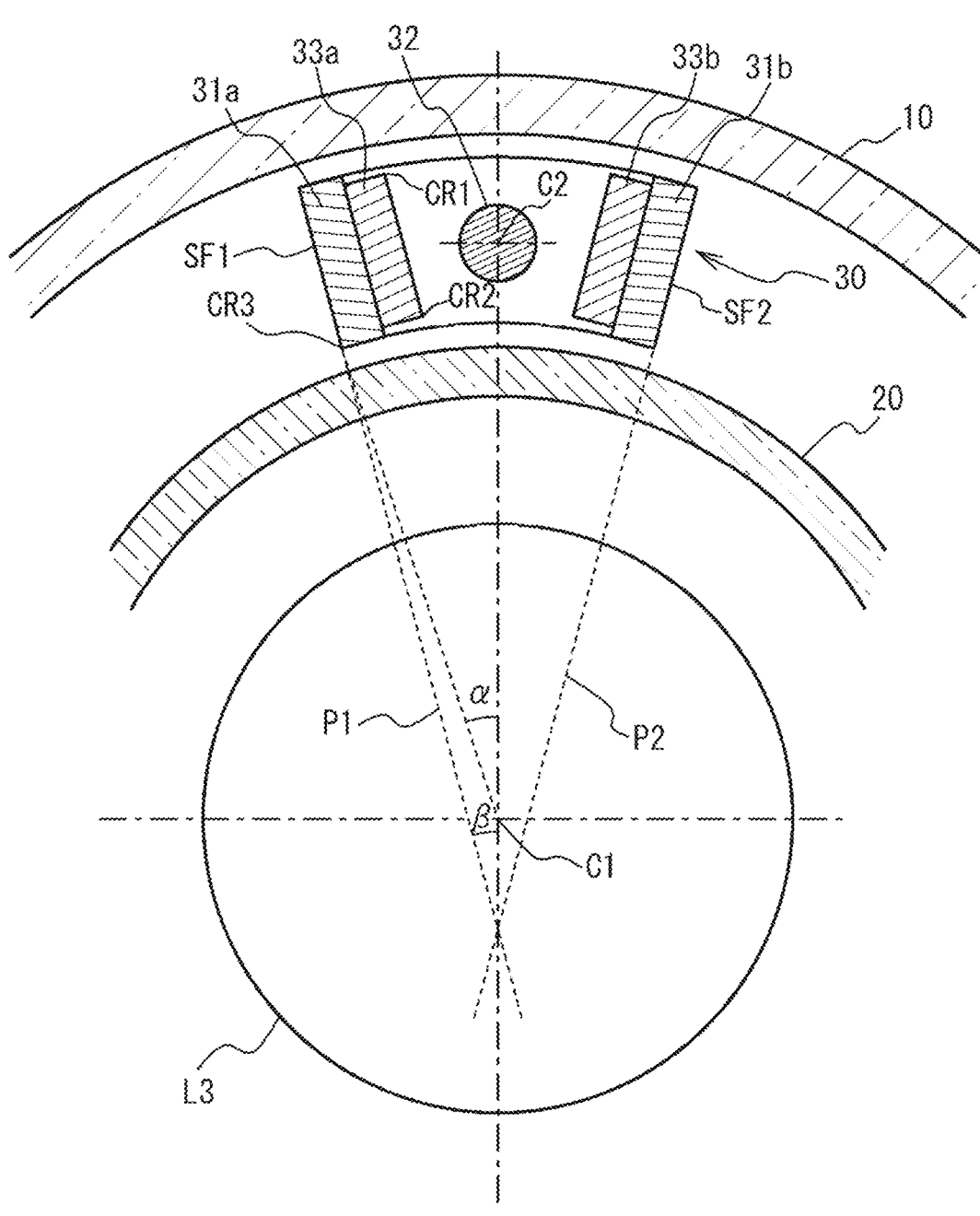
FIG. 6 is a view for describing the arrangement of first and second side yokes.

More specifically, as illustrated in FIG. 6, in the VCM 30, the angle β between the straight line connecting the center point C2 of the center yoke 32 and the center point C1 of the lens L3 and the plane P1 including the side surface SF1 of the first side yoke 31*a* is set within a range of 5.4° to 11°. The same applies to the angle between the straight line connecting the center point C2 of the center yoke 32 and the center point C1 of the lens L3 and the plane P2 including the side surface SF2 of the second side yoke 31*b*.

In a plane perpendicular to the optical axis OA, when the angle α between the straight line connecting the corner CR3, which is closer to the lens L3 and is farther from the center yoke 32, of the first side yoke 31*a* and the center point C1 of the lens L3 and the straight line connecting the center point C2 of the center yoke 32 and the center point C1 of the lens L3 is within a range of 16° to 17°, the angle β between the straight line connecting the center point C2 of the center yoke 32 and the center point C1 of the lens L3 and each of the plane P1 and the plane P2 is set within a range of 7.8° to 8.3°.

This allows the distance between the outer peripheral corner CR1 at the center yoke 32 side of the first magnet 33*a* and the center point C2 of the center yoke 32 to be substantially equal to the distance between the inner peripheral corner CR2 at the center yoke 32 side of the first magnet 33*a* and the center point C2 of the center yoke 32, and thus, the driving force of the VCM 30 can be improved.

Figure 7:
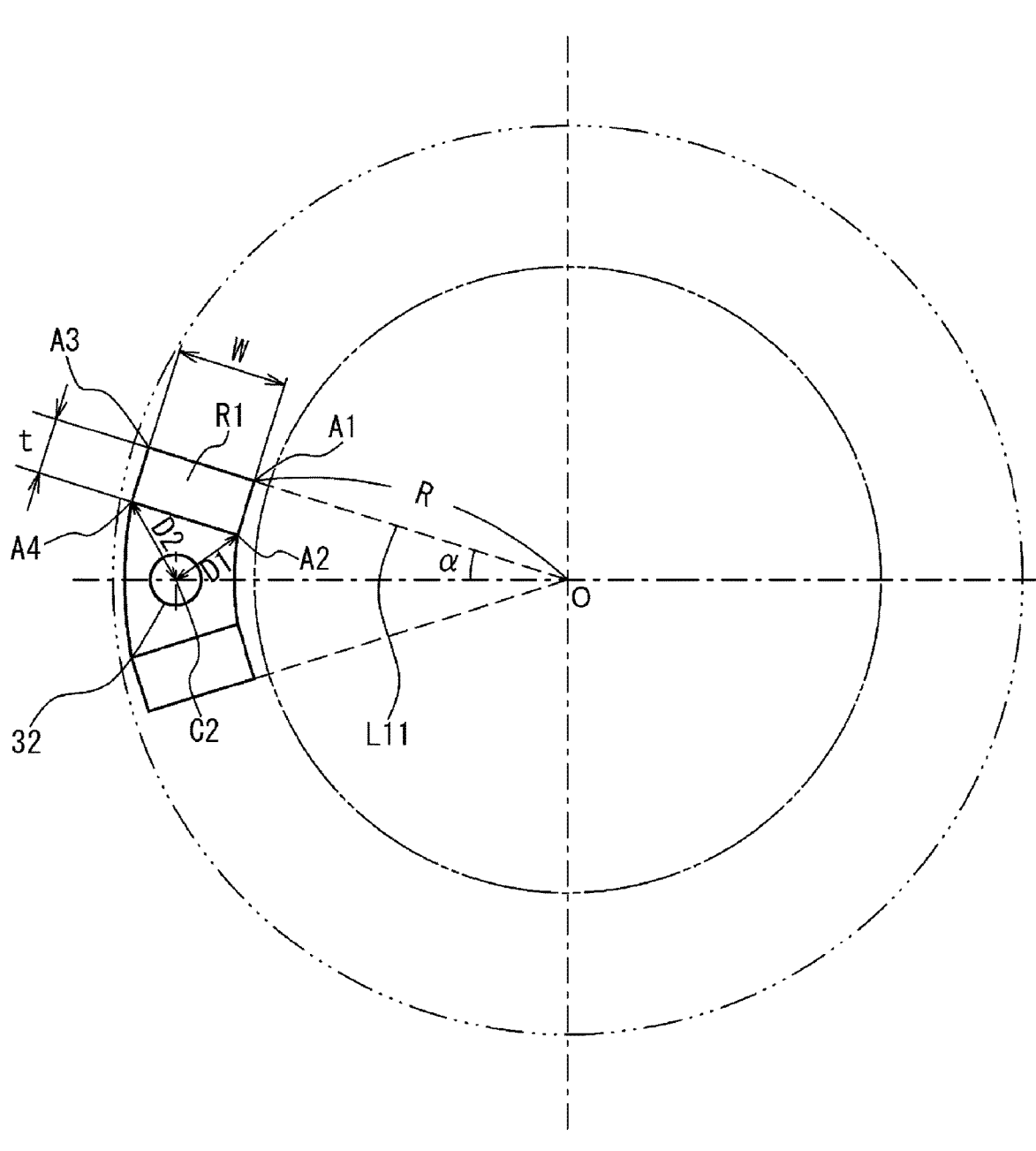
FIG. 7 is a view illustrating an outline of a model used to examine the arrangement of the first and second side yokes.
Figure 8:
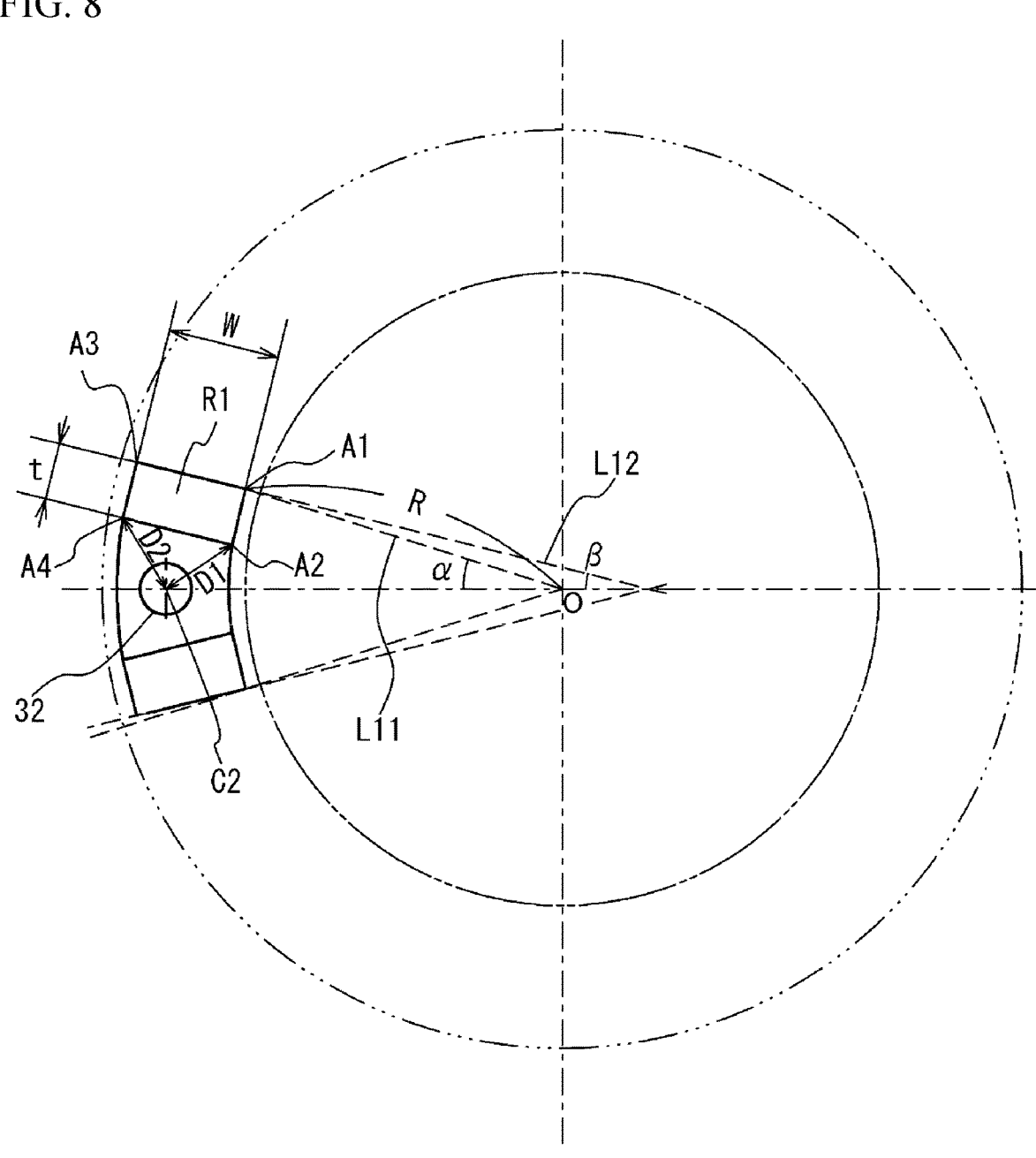
FIG. 8 is a view illustrating an outline of a model used to examine the arrangement of the first and second side yokes.

The arrangement of the first side yoke 31*a* and the second side yoke 31*b* was examined. FIG. 7 and FIG. 8 are views schematically illustrating models used to examine the arrangement of the first side yoke 31*a* and the second side yoke 31*b*. In FIG. 7 and FIG. 8, the coil 35 is not illustrated. The two dot chain line and the three dot chain line correspond to the outer peripheral surface of the second fixed barrel 20 and the inner peripheral surface of the first fixed barrel 10, respectively.

As illustrated in FIG. 7 and FIG. 8, the coordinates of the center axis O of the lens L3 are (0, 0), the side yoke and the magnet are integrally represented by a rectangle R1, and the vertices of the rectangle are indicated by A1, A2, A3, and A4.

The length of the rectangle R1 in the longitudinal direction is represented by W, and the length of the rectangle R1 in the lateral direction is represented by t. In a plane perpendicular to the optical axis OA, the length of the straight line L11 connecting the vertex A1 of the rectangle R1 and the center axis O of the lens L3 is represented by R, the angle between the straight line connecting the center point C2 of the center yoke 32 and the center axis O of the lens L3 and the straight line L11 connecting the vertex A1 of the rectangle R1 and the center axis O of the lens L3 is represented by α, and the angle between the straight line connecting the center point C2 of the center yoke 32 and the center axis O of the lens L3 and the straight line L12 passing through the vertices A3 and A1 of the rectangle R1 is represented by β. The case where α=β (the case of FIG. 7) corresponds to the comparative example.

On the assumption described above, the coordinates of the vertices A1 to A4 of the rectangle R1 and the center point C2 of the center yoke 32 are as follows.

| | |
|---|---|
| (R·cos α,R·sin α) | Coordinates of A1: |
| (R·cos α+t·sin β,R·sin α−t·cos β) | Coordinates of A2: |
| (R·cos α+W·cos β,R·sin α+W·sin β) | Coordinates of A3: |
| (R·cos α+W·cos β+t·sin β,R·sin α+W·sin β−t·cos β) | Coordinates of A4: |
| (R+0.5W,0) | Coordinates of C2: |

The distance D1 between the vertex A2 and the center point C2 of the center yoke 32 and the distance D2 between the vertex A4 and the center point C2 of the center yoke 32 were calculated for different values of R, W, t, α, and β. The calculation results are presented in Table 1.

TABLE 1

| | R [mm] | W [mm] | t [mm] | α [°] | β [°] | D1 [mm] | D2 [mm] |
|---|---|---|---|---|---|---|---|
| Comparative example | 30 | 10 | 5 | 17 | 17 | 6.28 | 8.37 |
| Example 1 | 30 | 10 | 5 | 17 | 8.2 | 6.78 | 6.79 |
| Example 2 | 40 | 10 | 5 | 17 | 8.3 | 9.05 | 9.06 |
| Example 3 | 50 | 10 | 5 | 17 | 8.3 | 11.63 | 11.63 |
| Example 4 | 20 | 7 | 4 | 23 | 11 | 5.82 | 5.81 |
| Example 5 | 20 | 7 | 3 | 20 | 9.6 | 5.72 | 5.72 |
| Example 6 | 20 | 7 | 2.5 | 19 | 9.1 | 5.83 | 5.82 |
| Example 7 | 40 | 10 | 5 | 15 | 6.8 | 7.90 | 7.78 |
| Example 8 | 40 | 10 | 6 | 16 | 8.3 | 7.63 | 7.77 |
| Example 9 | 50 | 10 | 4 | 11 | 5.4 | 7.85 | 7.86 |
| Example 10 | 50 | 10 | 5 | 12 | 5.8 | 7.79 | 7.77 |
| Example 11 | 50 | 10 | 6.5 | 16 | 7.8 | 9.52 | 9.51 |

Here, as the difference between the distance D1 and the distance D2 becomes smaller, the difference in strength between the magnetic field at the outer peripheral side and the magnetic field at the inner peripheral side becomes smaller, and the driving force of the voice coil motor can be improved. As presented in Examples 1 to 11, even when the dimensions are changed, the difference between the distance D1 and the distance D2 can be reduced when β is within a range of 5.4° to 11°.

For example, as presented in Examples 1 to 3, 8, and 11, when α is 16° to 17°, by setting β to 7.8° to 8.3°, the difference between the distance D1 and the distance D2 can be made small regardless of the magnitude of R.

As described above in detail, the lens barrel 100 in accordance with the present embodiment includes the first side yoke 31a and the second side yoke 31b each having a length in the optical axis direction, the center yoke 32 that has a length in the optical axis direction and is disposed between the first side yoke 31a and the second side yoke 31b, the first magnet 33a disposed on the first side yoke 31a, the second magnet 33b disposed on the second side yoke 31b, the coil 35 that is penetrated by the center yoke 32 and is movable in the optical axis direction by magnetic forces of the first magnet 33a and the second magnet 33b, and the lens holding frame that holds the lens L3 and is movable in the optical axis direction together with the coil 35. The plane P1 including the side surface SF1, which is farther from the center yoke 32 of the two side surfaces facing each other in the circumferential direction of the lens L3 of the first side yoke 31a intersects with the plane P2 including the side surface SF2, which is farther from the center yoke 32 of the two side surfaces facing each other in the circumferential direction of the second side yoke 31b. That is, the first side yoke 31a and the second side yoke 31b are arranged non-parallel to each other. This structure allows the VCM 30 to be efficiently arranged between the first fixed barrel 10 and the second fixed barrel 20. In addition, as compared with the case in which the first side yoke 31a and the second side yoke 31b are disposed in parallel to each other, the VCM 30 can be reduced in size in the radial direction of the lens L3.

In the present embodiment, the plane P1 and the plane P2 intersect at a position different from the center point C1 of the lens L3. Further, the center point C1 of the lens L3 is located between the center yoke 32 and the intersection line IL1 between the plane P1 and the plane P2.

By arranging the first side yoke 31a and the second side yoke 31b in this manner, as illustrated in FIG. 5, the difference between the distance d1 between the outer periph-eral corner CR1 at the center yoke 32 side of the first magnet 33a and the center point C2 of the center yoke 32 and the distance d2 between the inner peripheral corner CR2 at the center yoke 32 side of the first magnet 33a and the center point C2 of the center yoke 32 can be made small, so that the difference in strength between the magnetic field at the outer peripheral side and the magnetic field at the inner peripheral side becomes small and the driving force of the voice coil motor 30 can be improved. Thus, the lens L3 can be stably driven.

According to the present embodiment, in a plane perpendicular to the optical axis OA, the intersection line IL1 between the plane P1 and the plane P2 is on the straight line connecting the center point C2 of the center yoke 32 and the center point C1 of the lens L3. That is, in a plane perpendicular to the optical axis OA, the first side yoke 31a and the second side yoke 31b are arranged symmetrically with respect to the straight line connecting the center point C2 of the center yoke 32 and the center point C1 of the lens L3. Thus, the strength of the magnetic field between the first magnet 33a and the center yoke 32 and the strength of the magnetic field between the second magnet 33*b* and the center yoke 32 can be made to be equal to each other, so that the lens L3 can be stably driven.

According to the present embodiment, the intersection line IL1 between the plane P1 and the plane P2 intersects the lens L3. As a result, even when the upper yoke 34*a* (and the lower yoke 34*b*) has an arc shape as illustrated in FIG. 1C, it is possible to reduce the difference between the distance d1 between the outer peripheral corner CR1 at the center yoke 32 side of the first magnet 33*a* and the center point C2 of the center yoke 32 and the distance d2 between the inner peripheral corner CR2 at the center yoke 32 side of the first magnet 33*a* and the center point C2 of the center yoke 32. Therefore, it is possible to achieve a VCM that has a high driving force and can be arranged in the lens barrel 100.

In the present embodiment, in a plane perpendicular to the optical axis OA, the angle β between the straight line connecting the center point C2 of the center yoke 32 and the center point C1 of the lens L3 and each of the plane P2 including the side surface SF1 of the first side yoke 31*a* and the plane P2 including the side surface SF2 of the second side yoke 31*b* is set within a range of 5.4° to 11°. Thus, as presented in Table 1, the difference between the distance d1 between the outer peripheral corner CR1 at the center yoke 32 side of the first magnet 33*a* and the center point C2 of the center yoke 32 and the distance d2 between the inner peripheral corner CR2 at the center yoke 32 side of the first magnet 33*a* and the center point C2 of the center yoke 32 can be reduced, and the difference between the strength of the magnetic field at the outer peripheral side and the strength of the magnetic field at the inner peripheral side can be reduced, thereby improving the driving force of the VCM 30.

Further, in a plane perpendicular to the optical axis OA, when the angle α between the straight line connecting the corner CR3, which is closer to the lens L3 and farther from the center yoke 32, of the first side yoke 31*a* and the center point C1 of the lens L3 and the straight line connecting the center point C2 of the center yoke 32 and the center point C1 of the lens L3 is within a range of 16° to 17°, β is set within a range of 7.8° to 8.3°. As presented in Table 1, since this structure allows the distance D1 and the distance D2 to be substantially equal to each other, the strength of the magnetic field between each of the first magnet 33*a* and the second magnet 33*b* and the center yoke 32 can be made substantially uniform in the radial direction of the lens L3, so that the driving force of the VCM 30 can be improved.

In the above embodiment, the materials of the first and second side yokes 31*a* and 31*b* and the upper and lower yokes 34*a* and 34*b* are SPCC, and the material of the center yoke 32 is SS400, but this does not intend to suggest any limitation. For example, the first and second side yokes 31*a* and 31*b* and the upper and lower yokes 34*a* and 34*b* may be made of SPCC, and the center yoke 32 may be made of a material having a higher saturation flux density than SPCC (e.g., Fe-35% Co—Cr alloy, Fe-20% Co—Cr—V alloy, silicon steel Fe-3% Si alloy, pure iron, or SS400). This configuration eliminates the congestion of the magnetic flux generated at the end portions of the center yoke 32 in the optical axis direction and improves the flow of the magnetic flux in the center yoke 32, thereby improving the driving force of the VCM 30.

In the above embodiment, the cross-sectional area of the center yoke 32 in the plane perpendicular to the optical axis direction is constant along the optical axis OA, but this does not intend to suggest any limitation. For example, the cross-sectional areas of both end portions in the optical axis direction of the center yoke 32 may be larger than the cross-sectional area of the central portion. This structure eliminates the congestion of the magnetic flux generated at the end portions of the center yoke 32 in the optical axis direction and improves the flow of the magnetic flux in the center yoke 32, thereby improving the driving force of the VCM 30.

In the above embodiment, the second fixed barrel 20 that houses the lens holding frame F3 may be a movable barrel that is linearly movable in the optical axis direction. In the above-described embodiment and variations thereof, the lens barrel 100 may be a single-focus lens or a zoom lens.

The embodiments described above are examples of preferred implementations. However, the present invention is not limited thereto, and various modifications can be made without departing from the scope of the present invention, and arbitrary constituent elements may be combined.

DESCRIPTION OF REFERENCE NUMERALS 1 camera
30 voice coil motor
31*a* first side yoke
31*b* second side yoke
32 center yoke
33*a* first magnet
33*b* second magnet
35 coil
100 lens barrel
101 camera body
L3 lens
F3 lens holding frame

The invention claimed is:
1. A lens barrel comprising:
a first yoke and a second yoke each having a length in an optical axis direction;
a third yoke that has a length in the optical axis direction and is disposed between the first yoke and the second yoke;
a first magnet disposed on the first yoke;
a second magnet disposed on the second yoke;
a coil that is penetrated by the third yoke and is movable in the optical axis direction by magnetic forces of the first magnet and the second magnet; and
a lens holding frame that holds a lens and is movable together with the coil in the optical axis direction,
wherein a first plane including a first side surface, which is farther from the third yoke of two side surfaces of the first yoke facing each other in a circumferential direction of the lens, intersects with a second plane including a second side surface, which is farther from the third yoke of two side surfaces of the second yoke facing each other in the circumferential direction, and
wherein the first plane and the second plane intersect each other at a position different from a center point of the lens.

2. The lens barrel according to claim 1, wherein the center point of the lens is located between an intersection line between the first plane and the second plane and the third yoke.

3. The lens barrel according to claim 1, wherein in a plane perpendicular to the optical axis, an intersection line between the first plane and the second plane is on a straight line connecting a center point of the third yoke and the center point of the lens.

4. The lens barrel according to claim 1, wherein an intersection line between the first plane and the second plane intersects the lens.

5. The lens barrel according to claim 1, wherein a third plane including a third side surface, which is farther from the third yoke of two side surfaces of the first magnet facing each other in the circumferential direction of the lens, intersects with a fourth plane including a fourth side surface, which is farther from the third yoke of two side surfaces of the second magnet facing each other in the circumferential direction of the lens.

6. The lens barrel according to claim 1, wherein in a plane perpendicular to the optical axis, an angle between a first straight line connecting a center point of the third yoke and the center point of the lens and the first plane and an angle between the first straight line and the second plane are each within a range of 5.4° to 11°.

7. The lens barrel according to claim 6, wherein the angle between the first straight line and the first plane or the second plane is within a range of 7.8° to 8.3° when an angle between the first straight line and a straight line connecting a corner, which is closer to the lens and farther from the third yoke, of the first yoke and the center point of the lens is within a range of 16° to 17° in a plane perpendicular to the optical axis.

8. An imaging device comprising:
the lens barrel according to claim 1.

9. A lens barrel comprising:
a first yoke and a second yoke each having a length in an optical axis direction;
a third yoke that has a length in the optical axis direction and is disposed between the first yoke and the second yoke;
a first magnet disposed on the first yoke;
a second magnet disposed on the second yoke;
a coil that is penetrated by the third yoke and is movable in the optical axis direction by magnetic forces of the first magnet and the second magnet; and
a lens holding frame that holds a lens and is movable together with the coil in the optical axis direction,
wherein a first plane including a first side surface, which is farther from the third yoke of two side surfaces of the first yoke facing each other in a circumferential direction of the lens, intersects with a second plane including a second side surface, which is farther from the third yoke of two side surfaces of the second yoke facing each other in the circumferential direction, and
wherein in a plane perpendicular to the optical axis, an angle between a first straight line connecting a center point of the third yoke and a center point of the lens and the first plane and an angle between the first straight line and the second plane are each within a range of 5.4° to 11°.

10. The lens barrel according to claim 9, wherein the center point of the lens is located between an intersection line between the first plane and the second plane and the third yoke.

11. The lens barrel according to claim 9, wherein in a plane perpendicular to the optical axis, an intersection line between the first plane and the second plane is on the straight line connecting the center point of the third yoke and the center point of the lens.

12. The lens barrel according to claim 9, wherein an intersection line between the first plane and the second plane intersects the lens.

13. The lens barrel according to claim 9, wherein a third plane including a third side surface, which is farther from the third yoke of two side surfaces of the first magnet facing each other in the circumferential direction of the lens, intersects with a fourth plane including a fourth side surface, which is farther from the third yoke of two side surfaces of the second magnet facing each other in the circumferential direction of the lens.

14. The lens barrel according to claim 9, wherein the angle between the first straight line and the first plane or the second plane is within a range of 7.8° to 8.3° when an angle between the first straight line and a straight line connecting a corner, which is closer to the lens and farther from the third yoke, of the first yoke and the center point of the lens is within a range of 16° to 17° in a plane perpendicular to the optical axis.

15. An imaging device comprising:
the lens barrel according to claim 9.

\* \* \* \* \*